(12) United States Patent
McReynolds et al.

(10) Patent No.: US 8,179,258 B1
(45) Date of Patent: May 15, 2012

(54) METHOD FOR READING A TAG

(75) Inventors: Alan McReynolds, Los Altos, CA (US); Cyril Brignone, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1263 days.

(21) Appl. No.: 11/500,546

(22) Filed: Aug. 8, 2006

(51) Int. Cl.
  *G08B 13/14* (2006.01)
  *H04Q 5/22* (2006.01)
  *G06F 11/08* (2006.01)

(52) U.S. Cl. ............... 340/572.1; 340/572.2; 340/572.4; 340/10.1; 714/797

(58) Field of Classification Search ............... 340/572.1
  See application file for complete search history.

(56) References Cited

U.S. PATENT DOCUMENTS

| | | | | | |
|---|---|---|---|---|---|
| 4,730,188 | A | * | 3/1988 | Milheiser | 340/10.42 |
| 5,742,618 | A | * | 4/1998 | Lowe | 714/797 |
| 7,026,935 | B2 | * | 4/2006 | Diorio et al. | 340/572.2 |
| 7,304,579 | B2 | * | 12/2007 | Diorio et al. | 340/572.4 |
| 2003/0151497 | A1 | * | 8/2003 | Cole et al. | 340/10.34 |
| 2003/0214389 | A1 | * | 11/2003 | Arneson et al. | 340/10.1 |

* cited by examiner

*Primary Examiner* — George Bugg
*Assistant Examiner* — Jack Wang

(57) ABSTRACT

In a method for reading a tag, the tag is interrogated with a reader device having an antenna. A waveform of the signal received from the tag in response to the interrogation is analyzed through application of a numerical analysis technique. The signal is analyzed to estimate a bit pattern in the waveform.

19 Claims, 5 Drawing Sheets

500

| ITERATION | BIT | BIT | BIT | BIT | BIT | BIT | BIT |
|---|---|---|---|---|---|---|---|
| 1 | 0 | 1 | 1 | 0 | 1 | 1 | 0 |
| 2 | 1 | 1 | 1 | 0 | 1 | 1 | 1 |
| 3 | 0 | 1 | 0 | 1 | 0 | 1 | 0 |
| 4 | 0 | 1 | 1 | 0 | 1 | 0 | 0 |
| 5 | 1 | 0 | 1 | 1 | 1 | 0 | 1 |
| $\Sigma =$ | 2 | 4 | 4 | 2 | 4 | 3 | 2 |

| FIRST FRAME 204 | SECOND FRAME 206 |

METHOD FOR READING A TAG

BACKGROUND

Recently, the use of radio frequency identification (RFID) technology to locate and track various types of items has gained increased popularity. One reason for this increase is that the costs associated with manufacturing and implementing readers and tags employing RFID technology has steadily been decreasing. In addition, RFID readers and tags have been manufactured to be ever smaller for more densely packed RFID applications.

In conventional RFID applications, the RFID readers and tags typically move with respect to each other during the process of interrogation. Through this relative motion, multiple read attempts are often made by the RFID readers and eventually, a sufficiently high quality signal is obtained in both directions of the communication. Conventional RFID readers are thus typically designed to simply count pulses in a clearly delineated waveform received from the tags.

Problems sometimes arise, however, when conventional RFID readers and tags are maintained in relatively static positions with respect to each other. For instance, if an RFID reader is not positioned in a suitable location to receive relatively clear signals from a tag, the RFID reader will be unable receive any clearer signals because of the lack of motion between the RFID reader and the tag. As such, the RFID reader will be unable to obtain a correct read from the tag because each read will result in failure due to a weak signal or due to noise.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and a system for reading information transmitted from RFID tags. More particularly, for instance, the system disclosed herein is configured to apply numerical analysis techniques to estimate the bit patterns contained in signals transmitted by the RFID tags. In one regard, the numerical analysis techniques may be applied to estimate the bit patterns in situations where a reader device is incapable of receiving signals having nearly perfect waveforms. These situations may arise, for instance, when the reader device and the tags are relatively stationary with respect to each other.

Through implementation of the system and method disclosed herein, bit patterns from less than perfect signals received from tags may be estimated to thereby enable accurate interpretations of the information transmitted by the tags. As such, the reader device and the tag may not need to be moved with respect to each other to eventually deduce the correct response. In one regard, the time and expense involved in manually moving either or both of the reader device and the tags may substantially be averted.

Figures 1, 5:
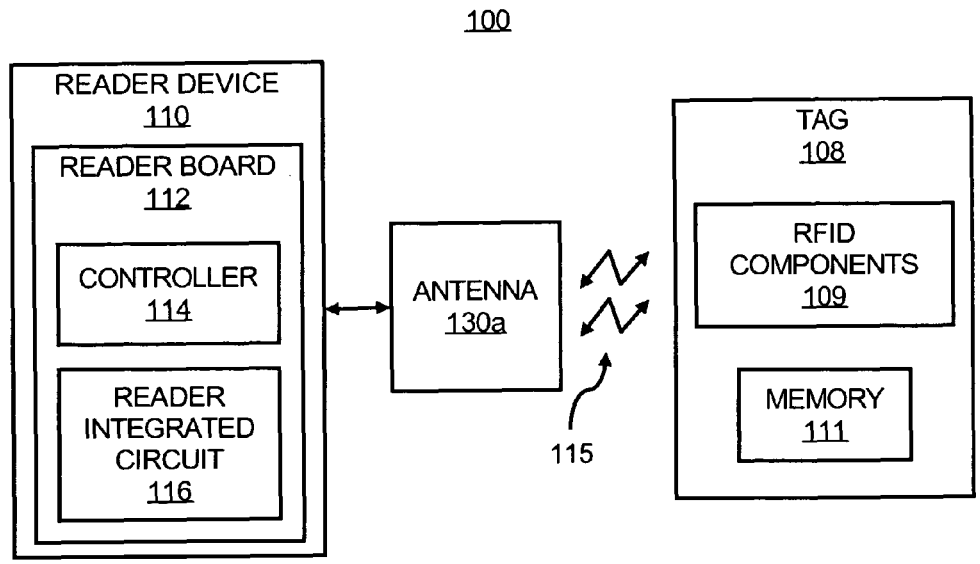
FIG. 1 shows a simplified schematic diagram of a tag tracking system, according to an embodiment of the invention.
FIG. 5 depicts an example of a table containing estimated bit patterns for a number iterations of some of the steps depicted in FIG. 3, according to an embodiment of the invention.

With reference first to FIG. 1, there is shown a simplified block diagram of a tag tracking system 100 configured to implement various examples of the invention disclosed herein. Although particular reference has been made herein below to the system 100 as including particular features, it should be understood that the system 100 may include additional components and that some of the components described may be removed and/or modified without departing from a scope of the system 100.

Figure 4:
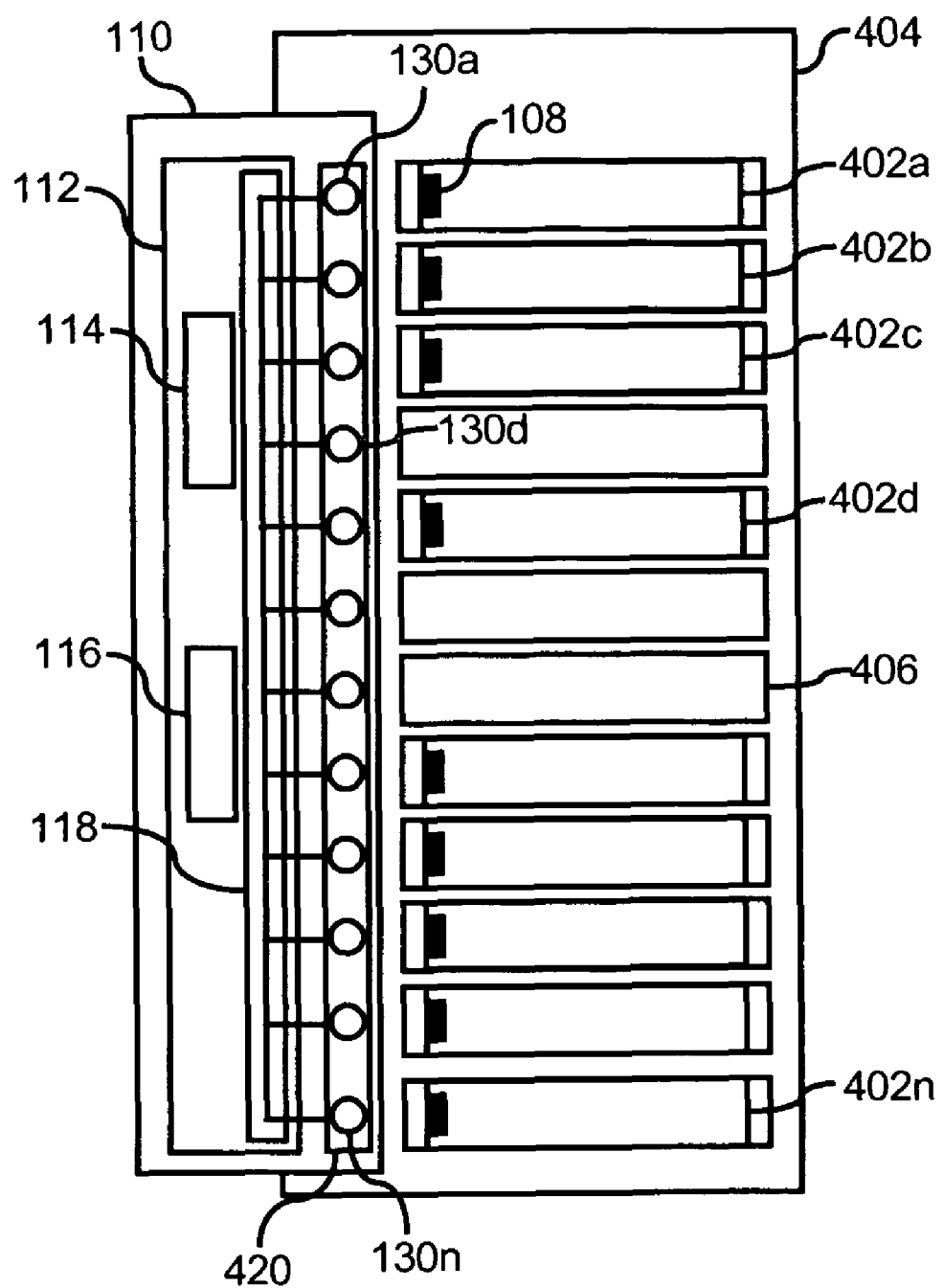
FIG. 4 depicts a simplified frontal view of an asset locating and tracking system in which the method for reading a tag depicted in FIG. 3 may be implemented, according to an embodiment of the invention.

As shown in FIG. 1, the tag tracking system 100 includes an RFID reader device 110 configured to interrogate an RFID tag 108. The reader device 110 is depicted as including a reader board 112, which includes a controller 114 and a reader integrated circuit 116, and an antenna 130a. Although a single antenna 130a has been depicted in FIG. 1, the reader device 110 may include any number of antennas 130a-130n, where "n" is an integer equal to or greater than one as described in greater detail herein below. In addition, the antennas 130a-130n may be arranged on an antenna board 420 (FIG. 4), which may form part of the reader board 112 or a separate board as shown in FIG. 4. Moreover, the antennas 130a-130n may be connected to a signal multiplexer 118, which is also shown in FIG. 4.

The controller 114 is generally configured to control the antenna 130a and to process information received from the tag 108. The reader integrated circuit 116 is generally configured to convert digital signals from the controller 114 into modulated energizing signals to be sent to the antenna 130a. The reader integrated circuit 116 may also demodulate amplitude variations that may be introduced into the digital signals when a tag 108 is placed in the resonance signal field 115 of an antenna 130a. The reader integrated circuit 116 may further select the appropriate signal processing parameters based upon a chosen protocol. For instance, the reader integrated circuit 116 may output demodulated tag 108 signals 115, which the controller 114 may decode to derive the identification and memory contents of the interrogated tag 108.

The tag 108 may comprise RFID components 109, which may include one or more components found in known RFID tags. More particularly, for instance, the RFID components 109 of the tag 108 may generate energy when the tag 108 is within the signal field 115 of the antenna 130a. In addition, the RFID components 109 may also interpret signals emitted by the reader device 110 and may respond to the reader device 110 by transmitting a signal back to the reader device 110. By way of example, the reader device 110 may transmit an instruction requesting that the tag 108 transmit its identification code to the reader device 110. In response, the RFID components 109 may access a memory 111 to retrieve the identification code and may transmit a signal 115 containing that information back to the reader device 110.

In addition, the tag 108 may be defined as hardware, information, signals, and the like, that are not necessarily intrinsic to the circuitry or software associated with an item to which the tag 108 may be associated. In other words, the tag 108 may be internally or externally attached to an item, but may be independent of the intrinsic workings of the item to which the tag 108 is attached.

According to an example, the reader device 110, and in certain instances, just the antenna 130a portion of the reader device 110, is maintained in a substantially static position with respect to the tag 108 when the reader device 110 interrogates the tag 108. Either or both of the antenna 130a portion and the tag 108 may otherwise be movable with respect to each other when an interrogation operation is not being performed. By way of example, both the reader device 110 (or the antenna 130a of the reader device 110) and the tag 108 may comprise relatively stationary components, which may occur in various asset tracking implementations. For instance, the reader device 110 (or the antenna 130a portion of the reader device 110) may be statically placed in an electronics cabinet and the tag 108 may be affixed to an asset housed in the electronics cabinet. This example is described in greater detail herein below.

In any case, because there is substantially no relative movement between the antenna 130a and the tag 108 during an interrogation operation, if one or both of the antenna 130a and the tag 108 were not originally placed in suitable positions with respect to each other for a sufficiently strong signal to be received by the antenna 130a, the reader device 110 may incorrectly read signals received from the tag 108. The reader device 110 may also incorrectly read signals received from the tag 108 if there is a relatively high level of noise in the signals. In either case, for instance, the reader device 110 may continuously incorrectly interpret incoming waveforms from the tag 108 because the signals 115 would normally be the same each time the signals 115 are transmitted by the tag 108 and received by the reader device 110.

Figure 2A:
FIGS. 2A-2D depict examples of various waveforms of signals received by a reader device, according to an embodiment of the invention.
Figure 2B:
Figure 2C:
Figure 2D:

To further illustrate some of the problems the reader device 110 may encounter, shown in FIG. 2A is an example of a perfect bit frame of a waveform 200 and shown in FIGS. 2B-2D are examples of waveforms 210-230 that the reader device 110 may receive when the return signal from the tag 108 is weak or has a relatively high level of noise.

With reference first to FIG. 2A, the waveform 200 is depicted as including sixteen transitions 202 in the first frame 204 and zero transitions in the second frame 206. In interpreting the waveforms, the controller 114 may count the number of transitions in a number of frames to determine whether a bit frame in the waveforms are "0" or "1". Thus, for instance, the controller 114 may determine that the top waveform arrangement in FIG. 2A is a "0". In addition, the controller 114 may determine that the bottom waveform arrangement in FIG. 2A is a "1" because the first frame 204 includes zero transitions and the second frame 206 includes sixteen transitions 202. As such, in this example, the controller 114 may conclude that a bit frame is a "0" if the bit frame has eight or less transitions 202 and that the bit frame is a "1" if the bit frame has 9 or more transitions 202.

In the example depicted in FIG. 2A, when the controller 114 has perfect bit frames, the controller 114 may relatively easily determine whether each bit frame constitutes a "0" or a "1". The reader device 110 may receive perfect bit frames in situations, for instance, when the reader device 110 and the tag 108 are movable with respect to each other. In these situations, the reader device 110 may obtain multiple readings with these components arranged at multiple positions with respect to each other which greatly improves the likelihood that reader device 110 may receive a sufficiently strong signal from the tag 108. However, in the case where there is substantially no relative motion between these components, perfect bit frames may never be received. Instead, the reader device 110 may receive the same response each time the tag 108 is interrogated.

By way of example, as shown in FIGS. 2B-2D, the controller 114 may receive various types of imperfect bit frames, which may be caused by weak signal strengths or noise. As shown in FIG. 2B, the waveform 210 includes eight transitions 202 in the first frame 204 and six transitions 202 in the second frame 206. In FIG. 2C, the waveform 220 is depicted as including ten transitions 202 in the first frame and four transitions in the second frame. In FIG. 2D, the waveform 230 is depicted as including eleven transitions in the first frame and zero transitions in the second frame. As such, because each of the first frames 204 has been interpreted as including eight or greater transitions, the controller 114 would most likely assume that each of these bit frames are "0", even though they may correctly be interpreted as a "1".

According to an example, in order to substantially prevent the controller 114 from misreading the bit frames of incoming waveforms, the controller 114 may implement one or more correcting codes on the incoming waveforms. In other words, the controller 114 may implement one or more numerical analysis methods to more accurately estimate which bit frames are "1's" and which bit frames are "0's" from the waveforms.

In one example, the controller 114 may employ one or more numerical analysis methods to track the estimations over a number of readings. In essence, the controller 114 may utilize knowledge gained through analysis of the tag 208 responses to improve the probability of correctly identifying and interpreting signals transmitted by the tag 108. In addition, the controller 114 may determine that a waveform has accurately been interpreted by cross-checking the estimation against the checksums that are transmitted by the tag 108. Various manners in which the controller 114 may operate to correctly estimate the bit patterns of signals that comprise less than perfect waveforms are described in greater detail herein below with respect to the following flow diagrams.

Figure 3:
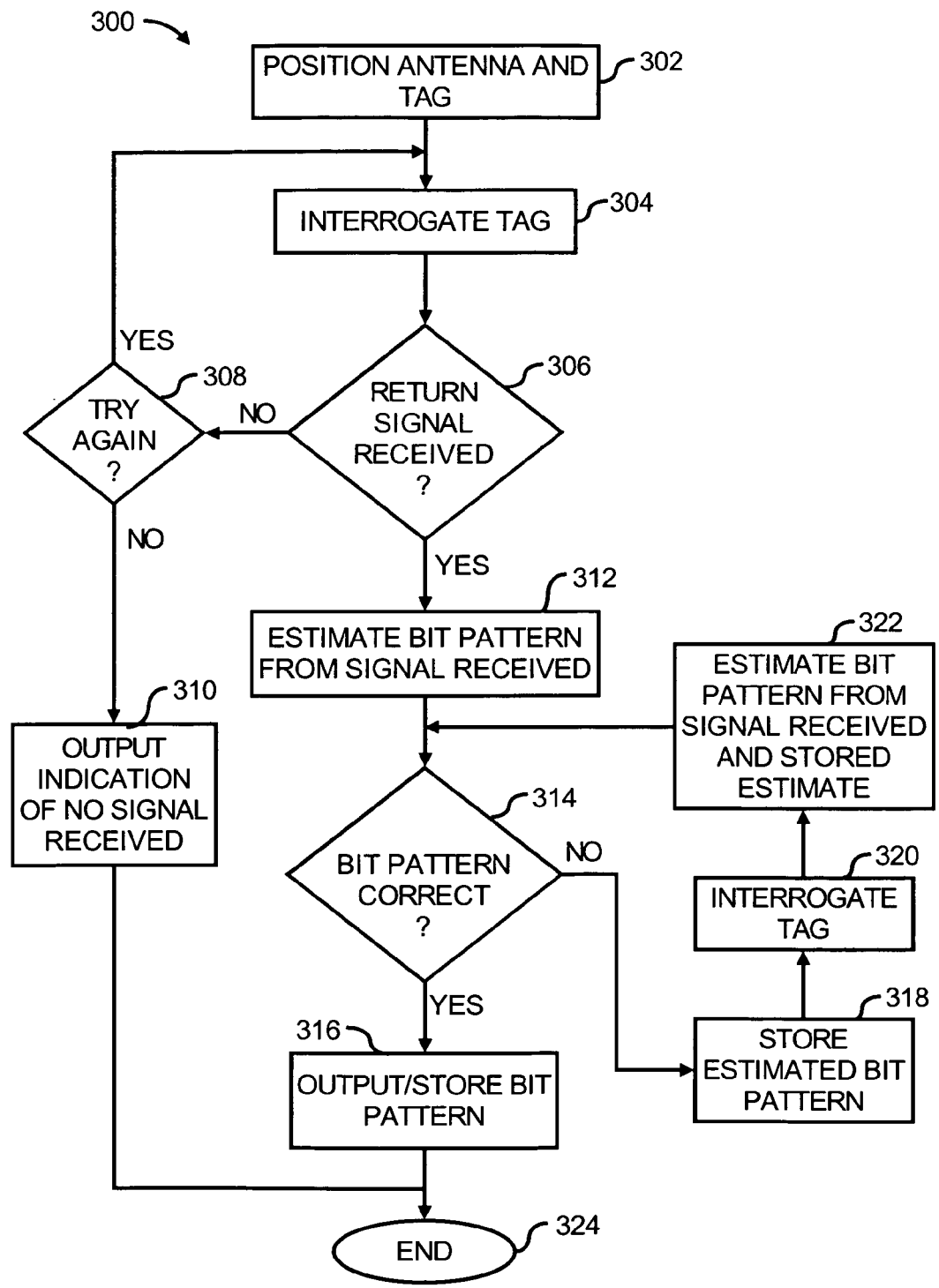
FIG. 3 shows a flow diagram of a method for reading a tag, according to an embodiment of the invention.

With reference now to FIG. 3, there is shown a flow diagram of a method 300 for reading tags with a reader device, according to an example of the invention. It is to be understood that the following description of the method 300 is but one manner of a variety of different manners in which an example of the invention may be practiced. It should also be apparent to those of ordinary skill in the art that the method 300 represents a generalized illustration and that other steps may be added or existing steps may be removed, modified or rearranged without departing from a scope of the method 300.

At step 302, the antenna 130a, and in certain instances, the reader device 110, and the tag 108 may be positioned with respect to each other. The tag 108 may be positioned, for instance, on an item to be tracked, a location where one or more conditions are to be detected, etc. In any regard, the antenna 130a and the tag 108 may be positioned in relatively fixed positions with respect to each other such that there is little or no relative movement between them when the antenna 130a is activated to interrogate the tag 108.

An example of an arrangement in which the antenna 130a and the tag 108 may be placed in relatively static positions with respect to each other is depicted in FIG. 4. More particularly, FIG. 4 depicts a simplified frontal view of an asset locating and tracking system 400, according to an example.

As shown in FIG. 4, the reader device 110 is generally depicted as being arranged to locate and track assets 402a-402n in a rack 404. The rack 404 may comprise an electronics cabinet and the assets 402a-402n may comprise, for instance, computer systems, servers, memories, hard drives, power supplies, etc. In other instances, the rack 404 may comprise a shelf for storing or displaying various products, such as, goods for consumer sale or other products housed for storage in the rack 404, a bin housing various components, etc. Thus, although particular reference is made below to the rack 404 as comprising an electronics cabinet, it should be understood that the rack 404 may have a broader scope than an electronics cabinet. Likewise, although the assets 402a-402n have been depicted as comprising electronic components, the assets 402a-402n may comprise other types of items, such as, consumer goods, electronics equipment for sale or storage, prescription drugs, etc., without departing from a scope of the system 100.

A more detailed description of the system 400 along with various other examples of environments in which various examples of the tag tracking system 100 disclosed herein may be employed are described in commonly assigned and copending U.S. Utility patent application Ser. No. 11/389, 750, filed on Mar. 27, 2006, entitled "READER DEVICE HAVING CLOSELY PACKED ANTENNAS", the disclosure of which is hereby incorporated by reference in its entirety.

Step 302 may be considered to be optional because the antenna 130a and the tag 108 may have previously been positioned with respect to each other, such that the antenna 130a is in position to adequately interrogate the tag 108.

At step 304, the reader device 110 may activate the antenna 130a emit a signal 115 and thereby interrogate the tag 108. As described above, the RFID components 109 of the tag 108 may convert the signal 115 into energy, which the RFID components 109 may use in determining a reader device 110 instruction. In response to the instruction, the RFID components 109 may transmit requested information back to the reader device 110.

The controller 114 of the reader device 110 may determine whether a return signal 115 was received from the tag 108, as indicated at step 306. More particularly, for instance, the controller 114 may determine whether any discernable signal was received from the tag at step 306, regardless of whether the controller 114 has properly decoded the signal.

If the controller 114 determines that no discernable signal was received from the tag 108, the controller 114 may output an indication that no signal was received from the tag 108, as indicated at step 310. This may be an indication that a tag is not present within the signal field of the antenna 130a. Prior to outputting the indication at step 310, the controller 114 may determine whether to try receiving a return signal from the tag 108 again, as indicated at step 308. The controller 114 may select to try again at step 308 based upon, for instance, a determination that the responses from the tag 108 have been too weak to detect. In addition, or alternatively, the controller 114 may be configured to perform multiple attempts at receiving a discernable signal from the tag 108. In this instance, the controller 114 may be programmed to perform steps 304-308 for a predetermined number of times before outputting the indication that no signal has been received at step 310.

If, on the other hand, the controller 114 determines that a discernable signal was received from the tag 108, the controller 114 may estimate a bit pattern from the received signal 115, as indicated at step 312. The controller 114 may estimate the bit pattern by counting the numbers of transitions found in the waveforms carried in the signal 115 as described above. In addition, as described below, the boundary at which the number of transitions is considered to be a "0" or a "1" may be varied to improved the accuracy of the controller 114 performed estimations.

According to an example, the controller 114 may employ a numerical analysis technique to estimate the bit pattern. For instance, the signal 115 transmitted by the tag 108 may be Manchester encoded to thus enable the controller 114 to relatively quickly determine whether the estimated bit pattern is accurate at step 312. As is generally known with Manchester encoding, each of the bits transmitted by the tag 108 is paired with its opposite bit. Therefore, if a "0" is sent, it is sent as a "01" and if "1" is sent it is sent as a "10". Manchester encoding therefore balances out, from a technical RF standpoint, a tag 108 transmission because the number of "1's" and "0's" are always even. Since only "01" or "10" pairs are valid, half of the possible errors (11 and 00) are eliminated. As such, the controller 114 may determine that the estimated bit pattern is inaccurate at step 314 if the estimate yields two zeros or two ones.

If the controller 114 initially determines that the estimated bit pattern is correct, the controller 114 may perform another check to determine whether the bit pattern is correct at step 314. More particularly, for instance, the controller 114 may compare the estimated bit pattern with a checksum that is transmitted in the signal 115 from the tag 108. If, after performing the comparison, the controller 114 determines that the bit pattern is correct, the controller 114 may output or store the estimated bit pattern, as indicated at step 316. The controller 114 may further interpret the bit pattern or another device or software may interpret the bit pattern.

If, however, the controller 114 determines that the bit pattern is incorrect at step 314, through either the initial check or the comparison with the checksum, the controller 114 may store the estimated bit pattern, as indicated at step 318. By way of example, the estimated bit pattern may be stored in the form of a table, for instance, the table 500 depicted in FIG. 5.

At step 320, the controller 114 may again implement the antenna 130a to interrogate the tag 108. In response to the interrogation, the tag 108 may return the same or similar waveform to the controller 114 as was returned at step 306. The waveform of the signal 115 should be the same unless there has been some change, for instance, in a cause of interference or noise in the signal 115.

In any regard, the controller 114 may again estimate the bit pattern from the signal 115 received from the tag 108, as indicated at step 322. At step 322, however, the controller 114 may consider the estimated bit pattern that was stored at step 320 in estimating the bit pattern at step 322. For instance, the controller 114 may apply a predetermined criteria to the estimated bit values to analyze trends in the estimated bit pattern. The predetermined criteria may include, for instance, summing the estimated bit values, determining the averages of the summed values, determining the medians of the summed values, discarding values that are clearly too high or too low, using the measured average bit rate to adjust the discrimination line between "0" and "1", consideration of the possibility that the energy in the tag 108 may decrease during operation and may therefore trend towards more "1's" or more "0's" as the response proceeds, etc.

By way of example, and with particular reference to the table 500 in FIG. 5, the controller 114 may sum the bit values for iterations numbered "1" and "2". Traversing the table 500 from left to right, the summed values would be, "1", "2", "2", "0", "2", "2", and "1". In this example, the controller 114 may set the boundary between "0" and "1" such that the summed values that are "1" or lower are assigned a "0" bit value and the summed values that are "2" are assigned a "1" bit value. The controller 114 may alternatively set the boundary such that the summed vales that equal "0" are assigned a "1" bit value and the summed values that equal "1" or higher are assigned a "1" bit value.

The controller 114 may again compare the estimated bit values with the checksum transmitted with the signal 115, as indicated at step 312. Again, if the estimated bit values is correct, the controller 114 may output/store the estimated bit pattern as indicated at step 316.

If, however, the estimated bit pattern is incorrect, the controller 114 may again store the bit pattern estimated at step 322. The controller 114 may store the estimated bit pattern, for instance, as another entry in the table 500. In addition, the controller 114 may continue to perform steps 314 and 318-322 until the controller 114 determines that the estimated bit pattern is correct at step 314. In this regard, for instance, the controller 114 may continue to populate the table 500 with bit patterns previously estimated at step 322. In addition, at step 322, the controller 114 may apply a predetermined criteria to the estimated bit values as described herein above.

For instance, with particular reference to FIG. 5, the controller 114 may sum may sum the bit values for five iterations. Traversing the table 500 form left to right, the summed values are listed as "2", "4", "4", "2", "4", "3", and "2". In one example, the controller 114 may set the boundary between "0" and "1" such that the summed values that are "3" or lower are assigned a "0" bit value and the summed values that are "4" and higher are assigned a "1" bit value. The controller 114 may alternatively set the boundary such that the summed values that equal "2" or lower are assigned a "0" and that summed values that equal "3" or higher are assigned a "1" bit value.

Once the controller 114 determines a correct bit pattern has been estimated, the controller 114 may output or store the estimated bit pattern at step 316, and the method 300 may end, as indicated at step 324.

Some or all of the operations set forth in the method 300 may be contained as a utility, program, or subprogram, in any desired computer accessible medium. In addition, the method 300 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 6:
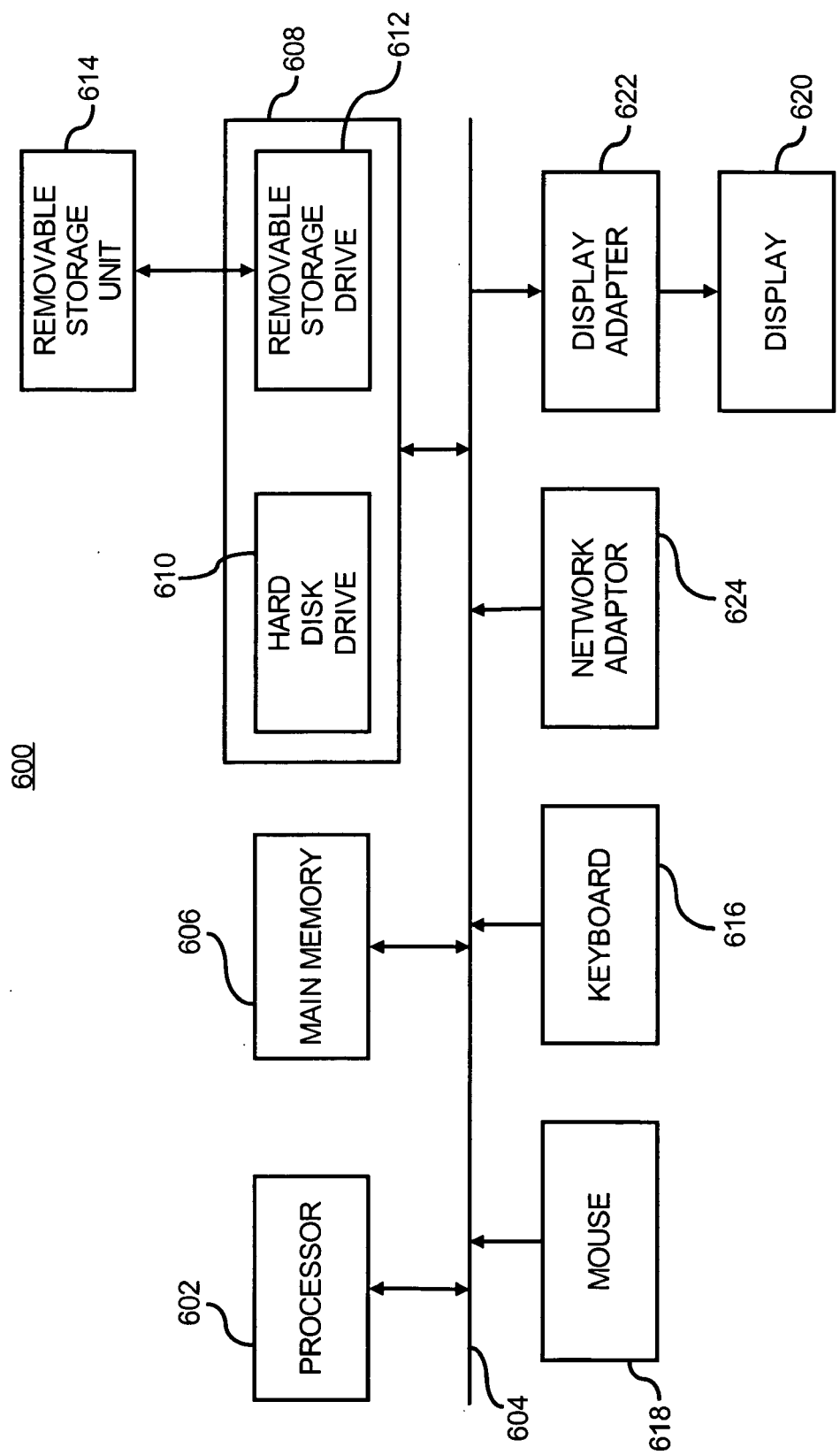
FIG. 6 illustrates a computer system, which may be employed to perform various functions described herein, according to an embodiment of the invention.

FIG. 6 illustrates a computer system 600, which may be employed to perform the various functions of the controller 114 described herein above, according to an example. In this respect, the computer system 600 may be used as a platform for executing one or more of the functions described hereinabove with respect to the controller 114.

The computer system 600 includes a processor 602 that may be used to execute some or all of the steps described in the method 300. Commands and data from the processor 602 are communicated over a communication bus 604. The computer system 600 also includes a main memory 606, such as a random access memory (RAM), where the program code for, for instance, the controller 304, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for reading tags may be stored. In addition, information pertaining to the estimated bit patterns may also be stored in at least one of the main memory 606 and the secondary memory 608.

The removable storage drive 610 may read from and/or write to a removable storage unit 614 in a well-known manner. User input and output devices may include, for instance, a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for reading a tag, said method comprising:

interrogating the tag with a reader device having an antenna;

analyzing a waveform of a signal received from the tag in response to the interrogation by applying a numerical analysis technique on assumed bit values of the waveform and assumed bit values of a previously received waveform to generate intermediate bit values and estimating the bit values of the waveform through a comparison of the intermediate bit values with a boundary level, wherein the intermediate bit values that fall below the boundary level are estimated to have a first bit value and the intermediate bit values that exceed the boundary level are estimated to have a second bit value.

2. The method according to claim 1, further comprising:
iteratively interrogating the tag and analyzing the waveforms of signals received from the tag in response to the interrogations, and wherein analyzing the waveforms further comprises utilizing previous analysis of the waveforms in analyzing a current analysis of the waveforms to thereby improve the accuracy in estimating the bit pattern of the waveform.

3. The method according to claim 2, wherein the signals received from the tag comprise checksums, the method further comprising:
following each interrogation and analysis iteration, comparing the estimated bit pattern with the checksum to determine whether the estimated bit pattern is accurate; and
iteratively continuing to perform the interrogation and analysis steps in response to a determination that the estimated bit pattern is inaccurate until an accurate estimated bit pattern is determined.

4. The method according to claim 3, further comprising:
at least one of outputting and storing the estimated bit pattern in response to the estimated bit pattern being accurate.

5. The method according to claim 1, further comprising:
determining whether a signal was received from the tag during an interrogation operation;
determining whether to perform another interrogation operation; and
performing at least one additional interrogation operation in response to a determination that another interrogation operation is to be performed.

6. The method according to claim 5, wherein determining whether to perform another interrogation operation further comprises determining whether a predetermined number of interrogation iterations have been performed and selecting to perform another interrogation operation in response to a determination that the predetermined number of interrogation iterations have not been performed.

7. The method according to claim 1, wherein the signal received from the tag comprises a checksum, the method further comprising:
comparing the estimated bit values with the checksum to determine whether the estimated bit values are accurate.

8. The method according to claim 1, wherein applying the numerical analysis further comprises:
applying a predetermined criteria on the intermediate bit values to analyze trends in the intermediate bit values and to determine the boundary level for the bit values forming the estimated bit pattern.

9. The method according to claim 8, wherein applying the predetermined criteria on the intermediate bit values further comprises summing the intermediate bit values estimated from signals received from the tag during multiple interrogation iterations to determine the boundary level for the intermediate bit values.

10. The method according to claim 8, wherein the signal received from the tag comprises a checksum, the method further comprising:
(a) comparing the estimated bit values with the checksum for accuracy;
(b) storing the estimated bit values in response to a determination that the estimated bit pattern is inaccurate;
(c) interrogating the tag with the reader device to obtain a waveform of a signal from the tag, wherein the waveform comprises bit values;
(d) applying the numerical analysis technique on assumed bit values of the waveform and assumed bit values of previously received waveforms to generate intermediate bit values; and
(e) estimating the bit values of the waveform through a comparison of the intermediate bit values with a boundary level, wherein the intermediate bit values that fall below the boundary level are estimated to have a first bit value and the intermediate bit values that exceed the boundary level are estimated to have a second bit value.

11. The method according to claim 10, further comprising:
repeating steps (a)-(e) until an estimated bit pattern is determined to be correct.

12. The method according to claim 11, further comprising:
at least one of outputting and storing the estimated bit pattern in response to the estimated bit pattern being determined to be correct.

13. A system for reading a tag, said system comprising:
an antenna to transmit an interrogating signal to the tag and to receive a return signal from the tag; and
a controller to control the antenna, wherein the controller is to estimate bit values in a waveform of the signal returned from the tag by
applying a numerical analysis technique on assumed values of the waveform and assumed bit values of a previously received waveform to generate intermediate bit values and estimating the bit values of the waveform through a comparison of the intermediate bit values with a boundary level, wherein the intermediate bit values that fall below the boundary level are estimated to have a first bit value and the intermediate bit values that exceed the boundary level are estimated to have a second bit value.

14. The system according to claim 13, wherein the antenna and the tag are positioned in relatively stationary positions with respect to each other at least when the antenna is activated to transmit the interrogating signal.

15. The system according to claim 14, wherein the tag is positioned on an asset and the antenna is positioned on a housing containing the asset.

16. The system according to claim 13, wherein the controller is further to perform an iterative process of tag interrogation and signal analysis until the controller has obtained sufficient data to accurately estimate the bit pattern in the waveform.

17. The system according to claim 16, wherein the controller is to store bit patterns estimated during each iteration of the iterative process, to sum up respective bit value estimations, and to estimate the bit patterns from the summed respective bit value estimations.

18. The system according to claim 16, wherein the controller is to determine that an estimated bit pattern is accurate based upon a comparison with a checksum received in the return signal.

19. A non-transitory computer readable storage medium on which is embedded one or more computer programs, said one or more computer programs implementing a method for reading a tag, said one or more computer programs comprising a set of instructions for:
(a) interrogating a tag;
(b) receiving a signal from the tag;
(c) estimating bit values from the waveform of the signal, wherein the bit values are estimated by
applying a numerical analysis technique on assumed bit values of the waveform and assumed bit values of a previously received waveform to generate intermediate bit values and estimating the bit values of the waveform through a comparison of the intermediate bit values with a boundary level, wherein the intermediate bit values that fall below the boundary level are estimated to have a first bit value and the intermediate bit values that exceed the boundary level are estimated to have a second bit value;

(d) determining whether the estimated bit pattern is accurate;

(e) storing the estimated bit pattern in response to the estimated bit pattern being inaccurate;

(f) repeating steps (a) and (b);

(g) estimating a second set of bit values from the waveform of the signal received at steps (b) and (f); and (h) repeating step (d); and repeating steps (a)-(h) until an accurate estimated bit pattern is determined.

* * * * *